US006400950B1

(12) United States Patent
Patel et al.

(10) Patent No.: US 6,400,950 B1
(45) Date of Patent: Jun. 4, 2002

(54) SYSTEM AND METHOD FOR DE-REGISTRATION OF MULTIPLE H.323 END POINTS FROM A H.323 GATEKEEPER

(75) Inventors: Mahesh Patel; Subrata Mukherjee, both of Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/362,944

(22) Filed: Jul. 28, 1999

(51) Int. Cl.[7] .................................................. H04Q 7/20
(52) U.S. Cl. ........................ 455/435; 455/560; 455/433
(58) Field of Search ................................. 455/435, 442, 455/560, 422, 432, 433, 445; 370/338

(56) References Cited

U.S. PATENT DOCUMENTS

2001/0001268 A1 * 5/2001 Menon et al. ............... 370/329

FOREIGN PATENT DOCUMENTS

WO        WO 00/33518         6/2000

OTHER PUBLICATIONS

ITU–T, H.225.0; Call Signalling Protocols and Media Stream Packetization for Packet–Based Multimedia Communication Systems; Chapter 7.1, H.225.0 Message Definitions; ITU–T Recommendation, Series H: Audiovisual and Multimedia Systems, Infrastructure of Audiovisual Services—Transmission Multiplexing and Synchronization; Sep. 1999; pp. 14–65.
ETSI TS 100 525 V7.1.0 (2000–01); Digital Cellular Telecommunications System (Phase 2+); Restoration procedures (GSM 03.07 version 7.1.0 Release 1998); ETSI Technical Specification; Sophia Antipolis, France; Jan. 2000; pp. 1–21.
ITU–T, H.323; Packet Based Multimedia Communications Systems; ITU–T Recommendation, Series H: Audiovisual and Multimedia Systems, Infrastructure of Audiovisual Services—Systems and Terminal Equipment for Audiovisual Services; Sep. 1999; pp. 1–129.
Herman C.H. Rao, Yi–Bing Lin and Sheng–Lin Cho; iGSM: VoIP Service for Mobile Networks; IEEE Communications Magazine; Apr. 2000; pp. 62–69.
PCT International Search Report dated May 22, 2001.

* cited by examiner

Primary Examiner—Nguyen T. Vo
(74) Attorney, Agent, or Firm—Jenkens & Gilchrist, P.C.

(57) ABSTRACT

A telecommunications system and method is disclosed for de-registering all Mobile Stations (MSs) at one time from a Gatekeeper of an H.323 system. In preferred embodiments, after an H.323 system shut down or upon receipt of a RESET message from a Home Location Register (HLR), the Mobile Switching Center (MSC) sends a single Unregistration Request (URQ) message to the Gatekeeper requesting de-registration of all of the MSs served by the MSC. The H.225 protocol for the URQ message is modified to indicate that all MSs associated with the MSC are to be de-registered. Alternatively, the modified URQ message can indicate that a certain group of MSs served by the MSC are to be de-registered.

30 Claims, 8 Drawing Sheets

US 6,400,950 B1

SYSTEM AND METHOD FOR DE-REGISTRATION OF MULTIPLE H.323 END POINTS FROM A H.323 GATEKEEPER

BACKGROUND OF THE PRESENT INVENTION

1. Field of the Invention

The present invention relates generally to telecommunications systems and methods for implementing a cellular system within an H.323 system, and specifically to providing efficient de-registration of multiple mobile stations utilizing H.323 protocols.

2. Background and Objects of the Present Invention

Local Area Networks (LANS) not only interconnect computers for data communications, but can also interconnect terminals or endpoints for voice communications. For example, many LANs are now implementing H.323 architecture to provide multimedia communications services over LANs. H.323 entities may be integrated into personal computers or implemented in stand-alone devices, such as wireline or wireless endpoints, e.g., video or audio telephones. H.323 entities can provide real-time audio, video and/or data communications capabilities in point-to-point or multipoint conferences.

Within an H.323 system, each H.323 endpoint is registered with a Gatekeeper for the H.323 system. The Gatekeeper stores an Internet Protocol (IP) address for the H.323 endpoint, so that when a connection to that H.323 endpoint is requested, the Gatekeeper will know where to route the connection. If the H.323 endpoint is a Mobile Station (MS), the IP address for the MS being served by an H.323 system typically includes the IP address for a Mobile Switching Center (MSC) serving the MS along with a specific port number for that MS. Therefore, although each MS has a separate subscriber record within the Gatekeeper, each MS has the same IP address, e.g., the IP address of the MSC.

In addition to the routing information, the Gatekeeper stores the permanent subscriber information for the MS and routes calls to and from the MS within the H.323 system. In addition, MSs also have a subscription with a Home Location Register (HLR) within the H.323 system or within a Public Land Mobile Network (PLMN) that is associated with the H.323 system area. Therefore, when a call to an MS originates from outside the H.323 system, a query to the HLR is performed to determine where to route the call. If the MS is registered within the H.323 system, the HLR will provide the address for the MSC serving the MS within the H.323 system.

When an HLR shuts down and restarts, the HLR typically loses all of the stored location information for each mobile subscriber associated with the HLR. Therefore, the HLR must send a RESET message to each MSC within the PLMN that the HLR is associated with. In response to the RESET message, each MSC must remove each mobile subscriber currently registered with that MSC. Therefore, unless those mobile subscribers perform a location update, calls cannot be made or received by them.

If one of those MSCs is within an H.323 system, since the routing information is stored in the Gatekeeper, and not in the MSC, the mobile subscribers must be de-registered from the Gatekeeper by the MSC upon receipt of the RESET message from the HLR. In the current architecture, upon receipt of the RESET message, the MSC sends a separate request for de-registration of each mobile subscriber to the Gatekeeper. For example, the H.323 MSC sends a first de-registration request for a first mobile subscriber to the Gatekeeper. The Gatekeeper subsequently de-registers the first mobile subscriber and acknowledges the de-registration of that first mobile subscriber to the MSC. Thereafter, the MSC sends a second de-registration request for a second mobile subscriber to the Gatekeeper. The Gatekeeper subsequently de-registers the second mobile subscriber and acknowledges the de-registration to the MSC. This process continues until the last mobile subscriber served by the MSC is de-registered with the Gatekeeper. It should be understood that the MSC can send the second de-registration request prior to receiving the acknowledgment of de-registration of the first request. However, each de-registration request must be sent separately. This process is extremely inefficient and slow.

SUMMARY OF THE INVENTION

The present invention is directed to telecommunications systems and methods for de-registering all registered Mobile Stations (MSs) at one time from the Gatekeeper of an H.323 system. In preferred embodiments, after an H.323 system shut down or upon receipt of a RESET message from a Home Location Register (HLR), the H.323 Mobile Switching Center (MSC) sends a single Unregistration Request (URQ) message to the Gatekeeper requesting de-registration of all of the registered MSs served by the MSC. The H.225 protocol for the URQ message is modified to indicate that all MSs associated with the MSC are to be de-registered. Alternatively, the modified URQ message can indicate that a certain group of MSs served by the MSC are to be de-registered.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions.

Moreover, some statements may apply to some inventive features but not to others.

Figure 1:
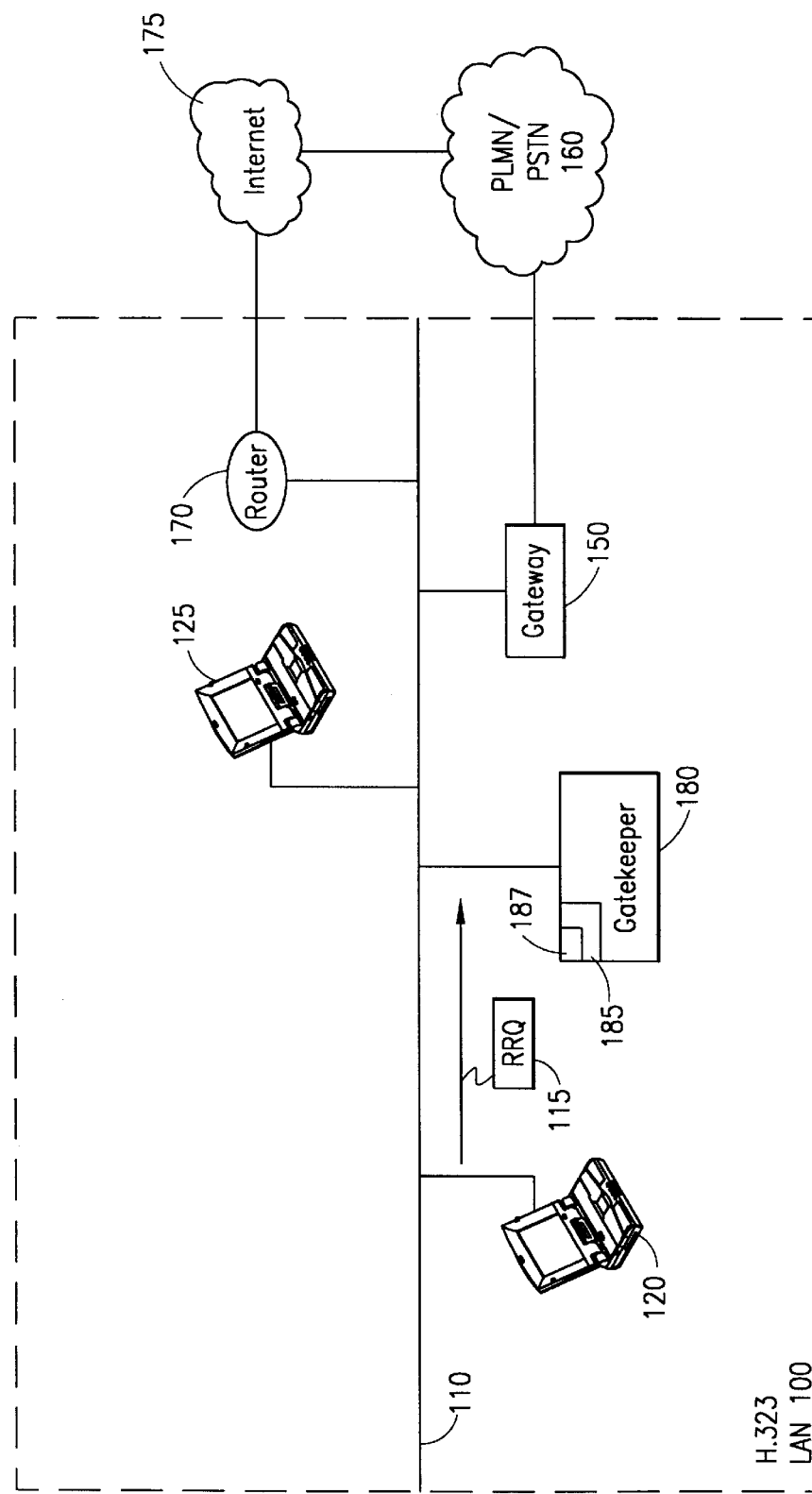
FIG. 1 is a block diagram of components in an H.323 local area network based upon the Internet Protocol (IP)

A sample H.323 system is shown in FIG. 1 of the drawings. When a first user logs-on to a first H.323 endpoint 120, which can be, for example, a personal computer or IP telephone, e.g., by providing a user name and password, an H.225 Registration Request (RRQ) message 115 is sent from the first H.323 endpoint 120 to a Gatekeeper 180. In response to the RRQ message 115, the Gatekeeper 180 stores an Internet Protocol (IP) routing address 187 within a subscriber record database 185 for the first H.323 endpoint 120.

Thereafter, when a second user on a second H.323 endpoint 125 places a call to the first user on the first H.323 endpoint 120, e.g., by dialing a telephone number or entering a user ID for the first user, the call is routed over the LAN backbone 110 to the Gatekeeper 180, which retrieves the address 187 for the first H.323 endpoint 120 and re-directs the call to the first H.323 endpoint 120. When the call connection is established between the first and second H.323 endpoints 120 and 125, respectively, IP voice packets are sent between the first and second H.323 endpoints 120 and 125, respectively, without necessarily being routed through the Gatekeeper 180.

If the calling party is within the Public Land Mobile Network (PLMN)/Public Switched Telephone Network (PSTN) 160, the call is routed to the Gatekeeper 180 through a Gateway 150, and subsequently to the first H.323 endpoint 120. Voice and data are sent to and from the first H.323 endpoint 120 via the Gateway 150, which converts the voice and data between the IP and the PLMN/PSTN format. In addition, speech and data may be routed within the H.323 system 100 and through the Internet 175 via an IP Router 170.

Figure 2:
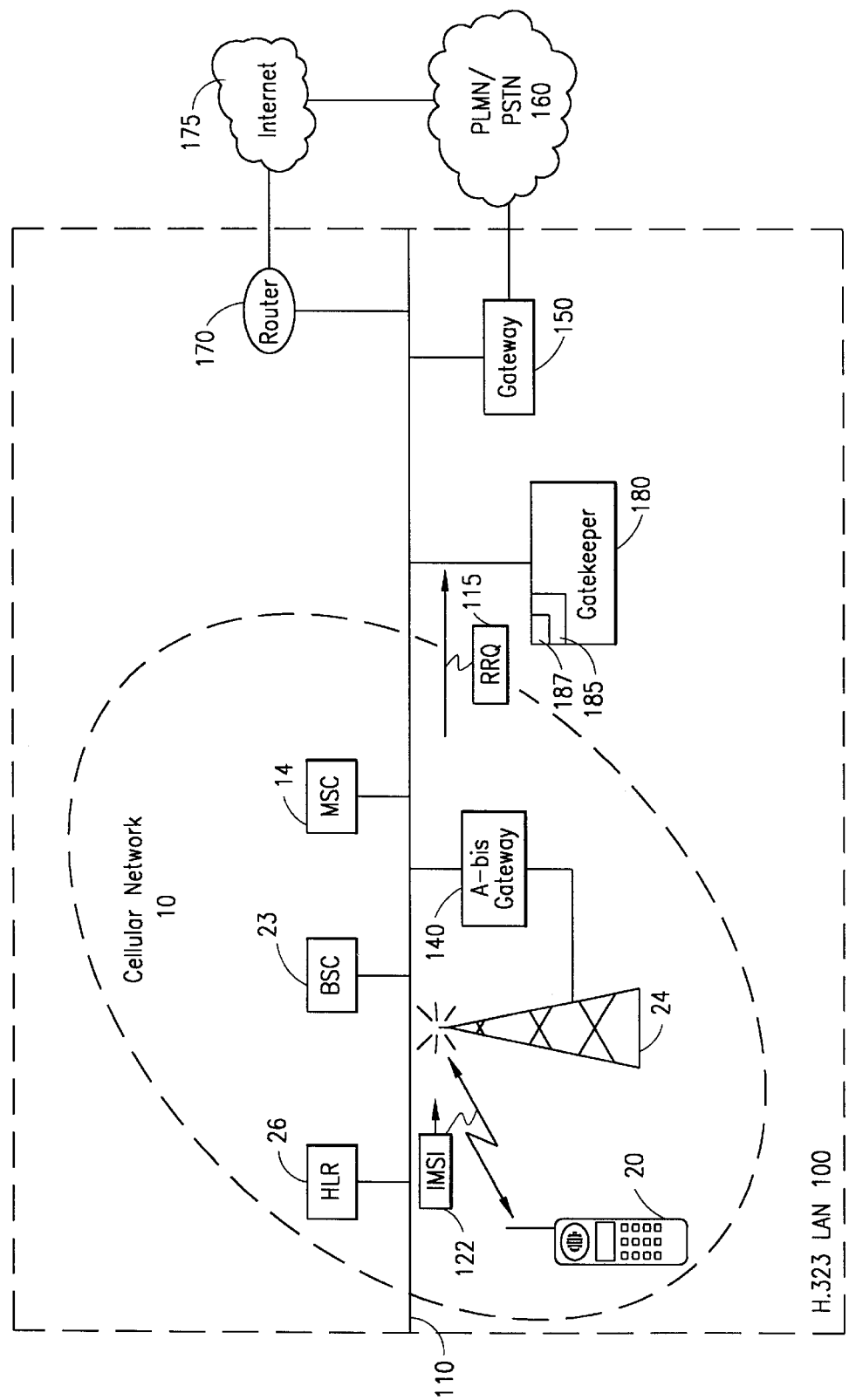
FIG. 2 is a block diagram of components in an H.323 local area network based upon IP that provides mobile communications.

If, however, as shown in FIG. 2 of the drawings, the H.323 endpoint is a Mobile Station (MS) 20, such as a cellular telephone, the MS 20 can register with the H.323 system 100 through a cellular system 10 within the H.323 system 100 by providing, for example, an International Mobile Subscriber Identity (IMSI) number 122 uniquely identifying the mobile subscriber. The mobile communications system 10 (i.e. cellular system) includes a Mobile Switching Center (MSC) 14 for handling mobility management and controlling calls made to and from MSs 20 within the H.323 system 100, a Base Station Controller (BSC) 23 for controlling radio related functions, such as channel assignment, and at least one A-bis Gateway 140 and associated BTS 24, all of which are connected to the LAN backbone 110. It should be noted that the BTS 24 is connected to the LAN backbone 110 via the A-bis Gateway 140. The A-bis Gateway 140 converts between circuit-switched signaling and payload used by the BTS 24 and packet-switched signaling and payload used by the H.323 system 100. The BTS 24 operates as a transceiver for transmitting and receiving data and control messages to and from the MS 20 over an air interface. It should also be noted that the MSC 14 and BSC 23 can be separate nodes or can be integrated together in one node.

The cellular system 10 within the H.323 system 100 may also include a Home Location Register (HLR) 26 for storing location information of the MSs 20, and non-H.323 system-related subscriber information associated with the MSs 20 belonging to the H.323 system 100. It should be understood that the HLR 26 may also be located outside of the H.323 system 100.

However, in either case, most of the permanent H.323 subscriber information relating to services offered to the subscribers belonging to the H.323 system 100 are stored within the Gatekeeper 180. In addition, the Gatekeeper 180 is also responsible for determining whether an H.323 subscriber is currently within the H.323 system 100. Therefore, when an MS 20 wants to register with the H.323 system 100, e.g., when the MS 20 powers on, the MS 20 transmits a location update message to the BTS 24, which forwards the location update message to the A-bis Gateway 140. The A-bis Gateway 140 converts the location update message into an Internet Protocol (IP) packet for transmission to the MSC 14 via BSC 23. The MSC 14, in turn, transmits an H.225 Registration Request (RRQ) message 115, which includes a subscriber number and other alias'of the IMSI number 122, such as an e-mail address, to the Gatekeeper 180 over the LAN backbone 110. Thereafter, the Gatekeeper 180 stores routing information 187, e.g., the IP address for the MSC 14 and an associated port number for the MS 20, within a subscriber record database 185 within the Gatekeeper 180.

Although each MS 20 associated with the MSC 14 is registered individually with the Gatekeeper 180, the MSC 14 itself is considered to be an H.323 endpoint. Therefore, in the H.323 architecture, there are multiple sub-endpoints (MSs 20), controlled by one main endpoint (MSC 14). When there is a need to de-register all the sub-endpoints (MSs 20) at one time, such as at H.323 system shut down or upon receiving a RESET message from the HLR 26, the main endpoint (MSC 14) currently must de-register each sub-endpoint (MS 20) from the Gatekeeper 180 one at a time.

Figure 3:
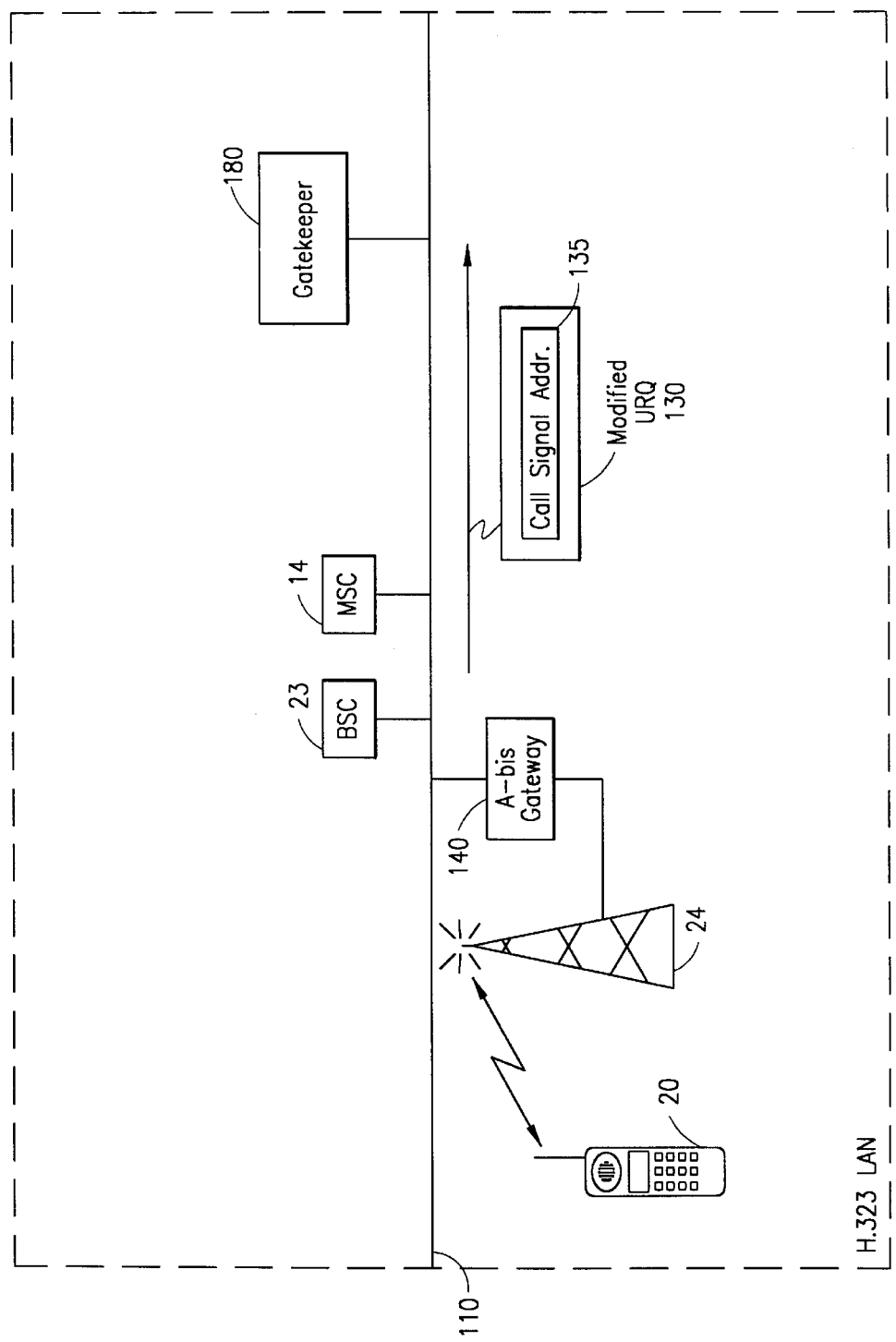
FIG. 3 illustrates the de-registration of multiple mobile stations from a Gatekeeper within an H.323 system in accordance with preferred embodiments of the present invention.

Therefore, in accordance with embodiments of the present invention, with reference now to FIG. 3 of the drawings, instead of de-registering each MS 20 separately, the MSC 14 can send a single de-registration message 130 to the Gatekeeper 180 requesting de-registration of all MSs 20 associated with that MSC 14. In order to accomplish this, a change to the H.225 protocol is needed. In the current H.225 protocol, the de-registration message 130 is referred to as an Unregistration Request (URQ) message 130. This URQ message 130 is sent from the MSC 14 (main endpoint) to the Gatekeeper 180 to indicate that the association between one MS 20 and the Gatekeeper 180 should be broken. This URQ message 130 includes a Call Signal Address 135 that identifies the call signaling address for the MS 20 that is to be de-registered. Since there are multiple MSs 20 associated with the MSC 14, this Call Signal Address 135 typically includes an Internet Protocol (IP) address of the MSC 14 and a specific port number associated with the MS 20.

In order to instruct the Gatekeeper 180 to de-register all MSs 20 associated with the MSC 14, the MSC 14 can send a message to the Gatekeeper 180 indicating that each MS 20 associated with the MSC 14 must be de-registered. For example, in preferred embodiments, the Call Signal Address parameter 135 within the URQ message 130 can be modified to indicate that each MS 20 associated with the MSC 14 must be de-registered. Alternatively, the URQ message 130 as a whole or another parameter within the URQ message 130 could be modified to indicate that all MSs 20 must be de-registered. In a further alternative embodiment, a new message, instead of the URQ message 130, can be sent to the Gatekeeper 180 instructing the Gatekeeper 180 to de-register all MSs 20.

Figure 4A:
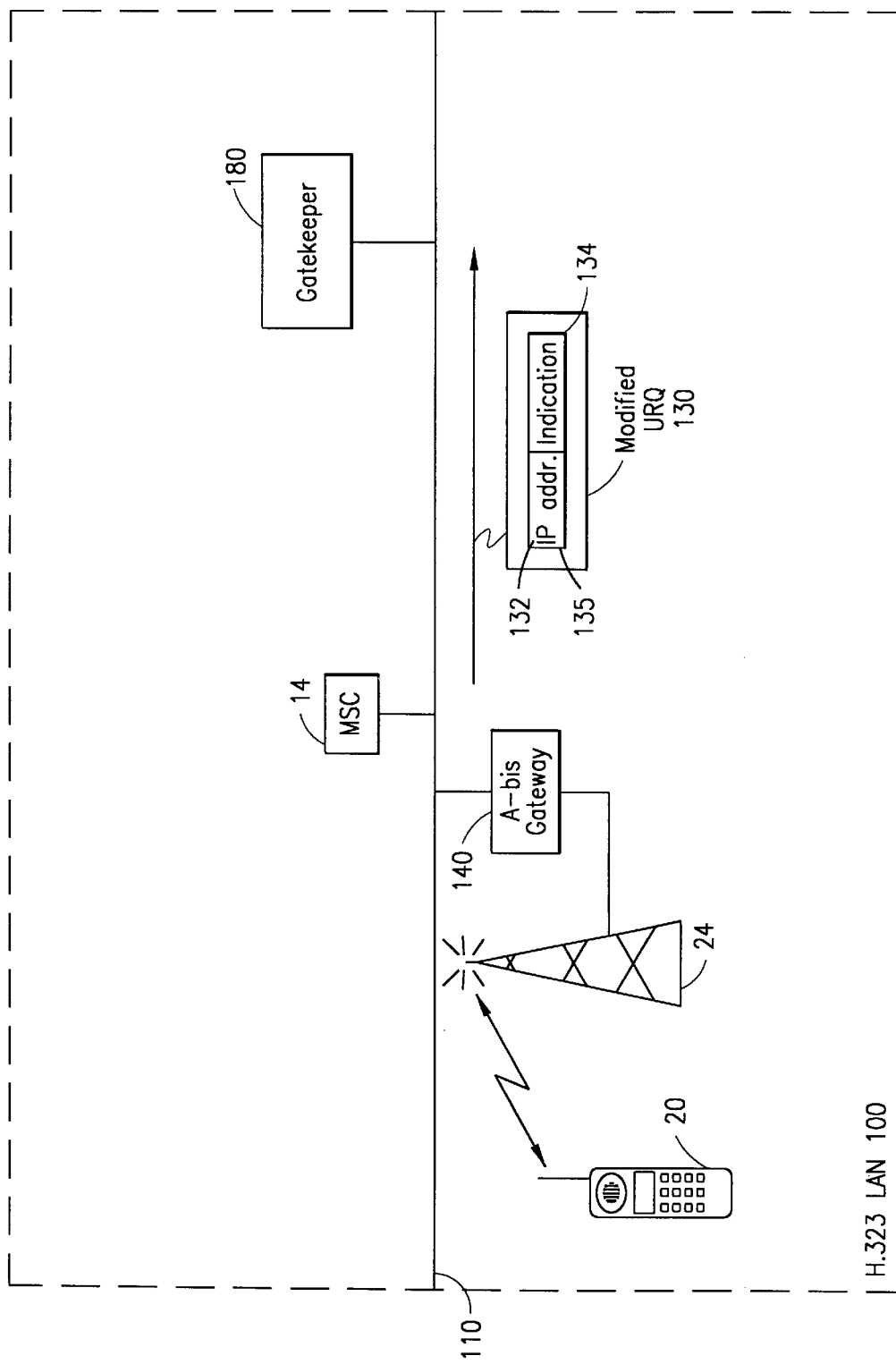
FIGS. 4A–4D illustrate various embodiments of a modified Unregistration Request (URQ) message sent to the Gatekeeper to de-register multiple mobile stations.

For example, in accordance with the preferred embodiment, with reference now to FIG. 4A of the drawings, the Call Signal Address 135 can include an IP address 132 of the MSC 14 and an indication 134 that all MSs 20 associated with the MSC 14 must be de-registered. This indication 134 can be either a single notation or a range of port numbers, e.g., port 1 . . . port n, associated with the IP address of the MSC 14.

Figure 4B:
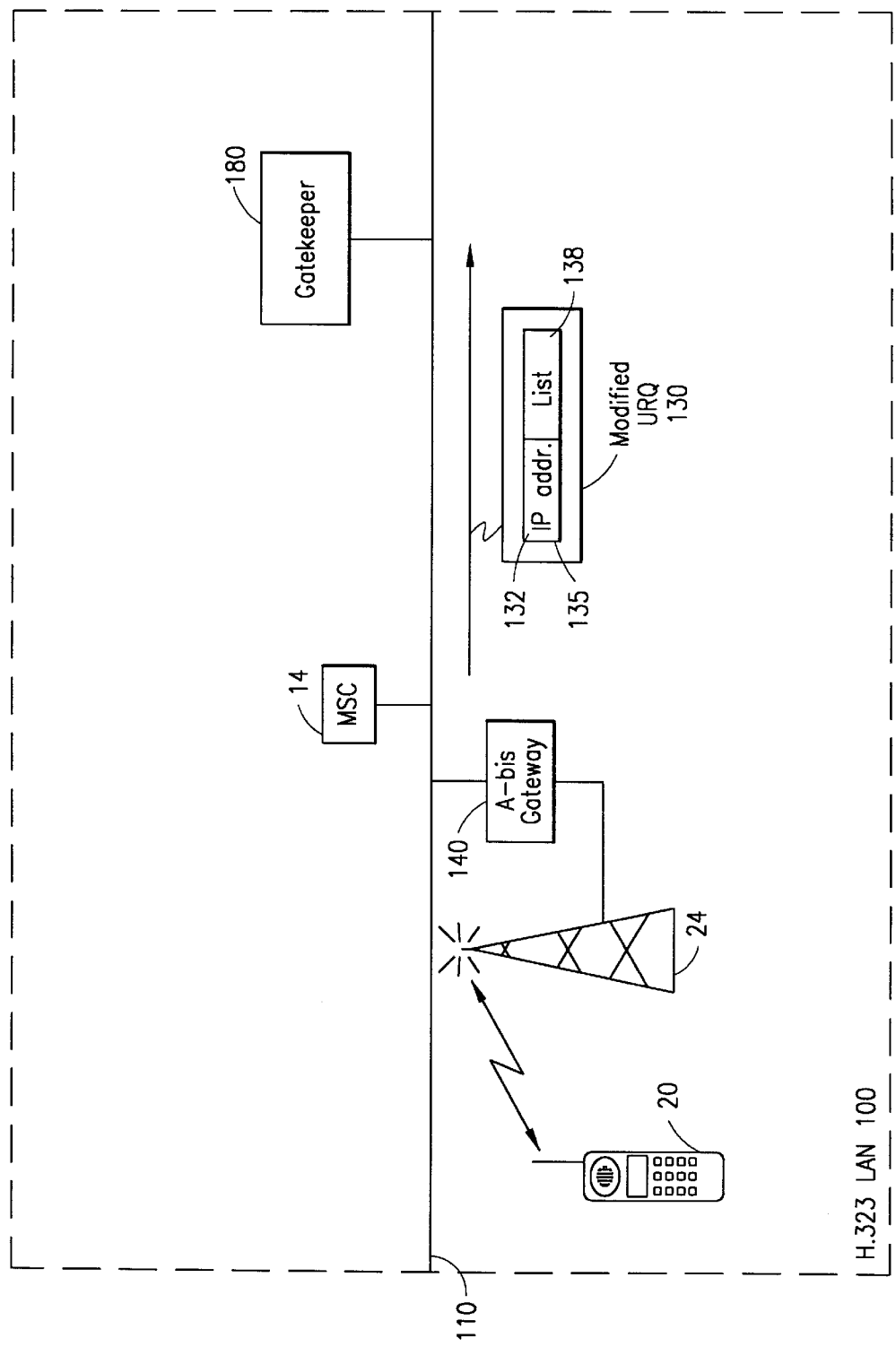

Alternatively, as shown in FIG. 4B of the drawings, the Call Signal Address 135 can include a certain number 138 of the MSs associated with the MSC 14. This may be useful in systems where load sharing is important. For example, the Call Signal Address 135 can include the IP address 132 of the MSC 14, along with a list of port numbers 138, e.g., port 1 . . . port 10. Subsequent URQ messages 130 can include the rest of the port numbers associated with the IP address 132 of the MSC 14.

Figure 4C:
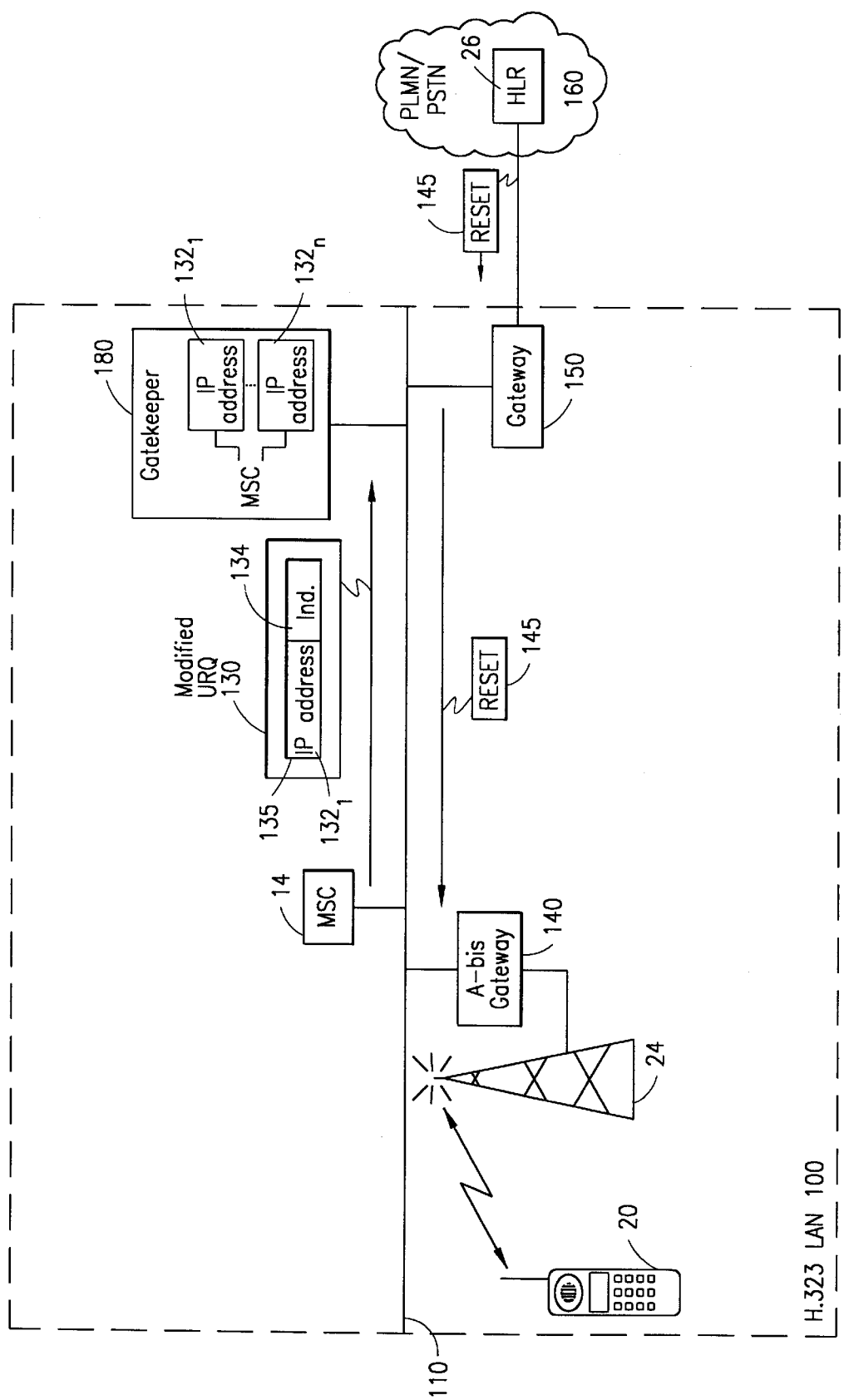

In a further alternative embodiment, as shown in FIG. 4C of the drawings, in the situation where a RESET message 145 is received from one HLR 26, but not all of the MSs 20 within the H.323 system 100 are registered with that HLR 26, the Call Signal address 135 can also indicate the specific MSs 20 registered with the HLR 26 that sent the RESET message 145. For example, the MSC 14 could have multiple IP addresses $132_1$–$132_n$ associated therewith. In this example, IP address $132_1$ is associated with the HLR 26 that sends the RESET message 145. Therefore, when the HLR 26 sends the RESET message 145, the MSC 14 can include the IP address $132_1$ of the MSC 14 that is associated with that HLR 26 and the indication 134 that all MSs 20 associated with that IP address $132_1$ be de-registered within the URQ message 130 that is sent to the Gatekeeper 180. Although the HLR 26 is shown within the PLMN/PSTN 160, it should be noted that the HLR 26 could be located within the H.323 system 100.

Figure 4D:
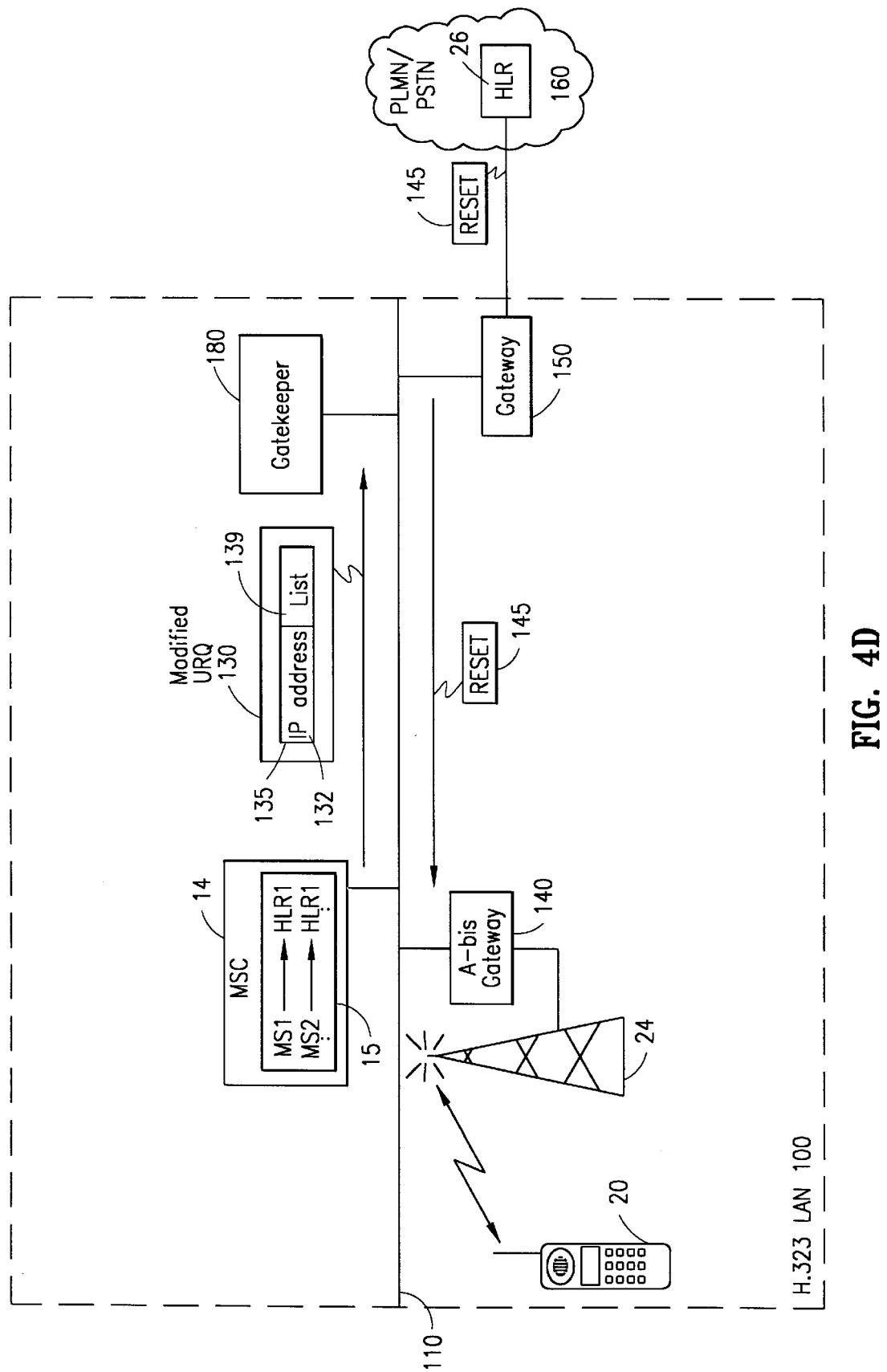

In still a further alternative embodiment, as shown in FIG. 4D of the drawings, the MSC 14 can maintain a database 15 of all MSs 20 registered with the MSC 14 and their associated HLR's 26. Thereafter, when the RESET message 145 is received from one of these HLRs 26, the Call Signal Address 135 within the URQ message 130 can include the IP address 132 for the MSC 14 and a list 139 of all port numbers associated with the HLR 26 that sent the RESET message 145.

Figure 5:
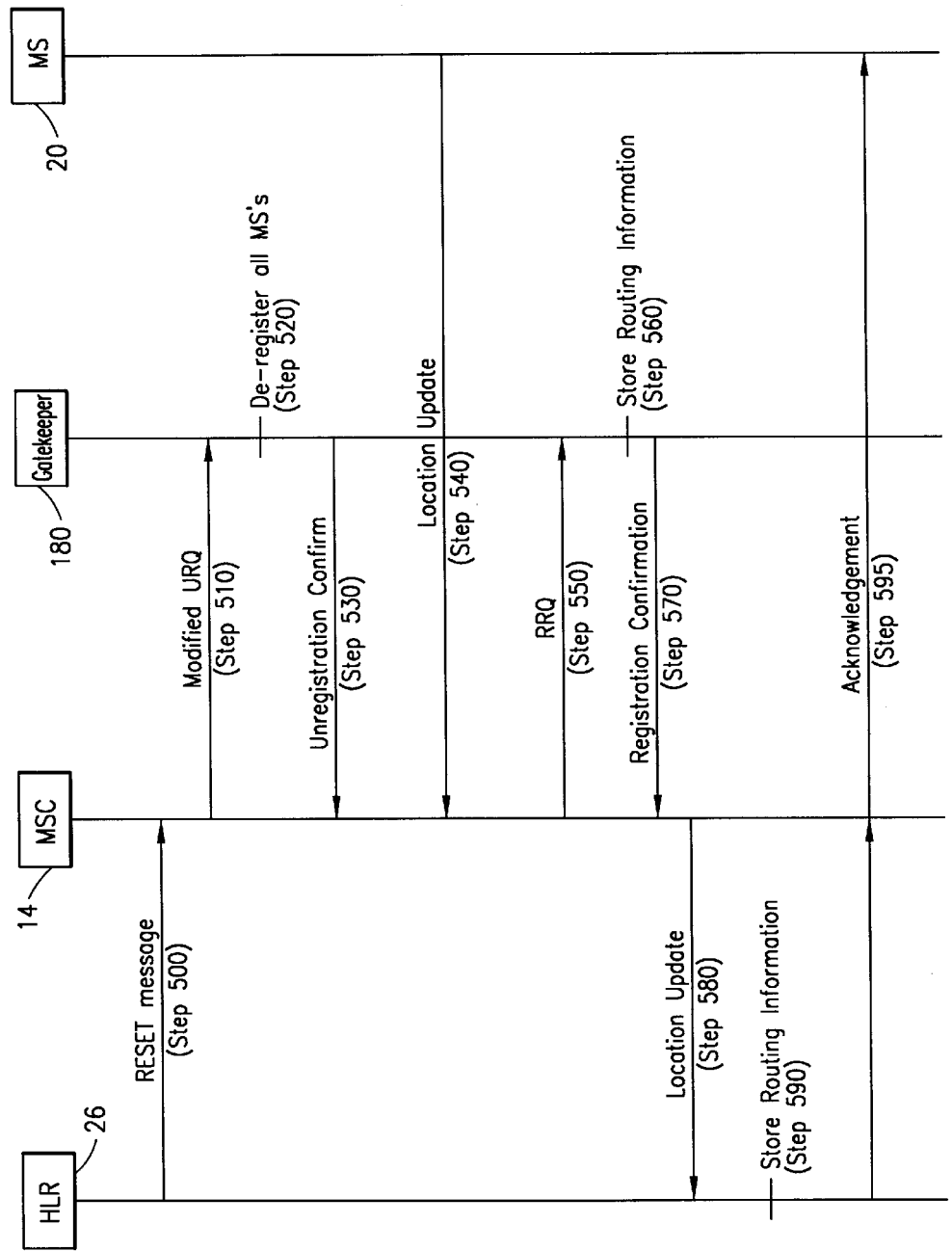
FIG. 5 is a signaling diagram illustrating the steps for de-registering multiple mobile stations from a Gatekeeper within an H.323 system upon the receipt of a RESET message from a Home Location Register.

With reference now to the signaling diagram shown in FIG. 5 of the drawings, the multiple MS 20 de-registration process is more clearly illustrated. When the MSC 14 receives the RESET message 145 from the HLR 26 (step 500), the MSC 14 sends a modified URQ message 130 (step 510), requesting de-registration of all MSs 20 associated with the MSC 14 and that HLR 26, to the Gatekeeper 180. The modified URQ message 130 can take any of the formats described in FIGS. 4A–4E. Upon receipt of this modified URQ message 130, the Gatekeeper 180 de-registers all MSs 20 indicated by the MSC 14 from the Gatekeeper's 180 records (step 520). Thereafter, the Gatekeeper 180 sends an Unregistration Confirm (UCF) message to the MSC 14 (step 530), which acknowledges the de-registration of all of the specified MSs 20.

Once all of the MSs 20 have been de-registered from the Gatekeeper 180, those MSs 20 will not be able to make or receive calls until they re-register with the Gatekeeper 180 via the MSC 14. Therefore, at power on, or before making or receiving any call or service from the H.323 system 100, each MS 20 will need to register with the Gatekeeper 180, e.g., by sending an Update Location message to the MSC 14 (step 540). The MSC 14, in turn, transmits the H.225 Registration Request (RRQ) message to the Gatekeeper 180 (step 550), which, in turn, stores routing information, e.g., the IP address for the MSC 14 and the port number for the MS 20, within a subscriber record database within the Gatekeeper 180 (step 560). Thereafter, the Gatekeeper 180 sends a registration confirmation message to the MSC 14 confirming the registration of the MS 20 (step 570).

In addition, the MSC 14 transmits the update location message to the HLR 26 (step 580), which stores the address for the MSC 14 within a subscriber record database therein (step 590). Thereafter, the HLR 26 acknowledges the update location message to the MSC 14, which in turn acknowledges the update location message to the MS 20 (step 595). After re-registration, the MS 20 can place and receive calls, and send and receive short messages, as is understood in the art.

It should be understood that the aforementioned de-registration process can be applied to any H.323 architecture in which multiple sub-endpoints associated with one main endpoint must be de-registered from the Gatekeeper 180 at one time.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An H.323 system for substantially simultaneously de-registering multiple sub-endpoints, comprising:
    a main endpoint within said H.323 system having at least two sub-endpoints associated therewith, said main endpoint determining that said sub-endpoints must be de-registered and sending a single de-registration message indicating that more than one of said at least two sub-endpoints must be de-registered; and
    a Gatekeeper for receiving said single de-registration message and, in response to said de-registration message, substantially simultaneously de-registering said more than one of said at least two sub-endpoints from said Gatekeeper.

2. The H.323 system of claim 1, wherein said main endpoint is a Mobile Switching Center.

3. The H.323 system of claim 2, wherein said sub-endpoints are mobile stations in wireless communication with said Mobile Switching Center.

4. The H.323 system of claim 1, wherein said de-registration message is an Unregistration Request message.

5. The H.323 system of claim 4, wherein said Unregistration Request message includes a Call Signal Address parameter.

6. The H.323 system of claim 5, wherein said Call Signal Address parameter includes an Internet Protocol address of said main endpoint and an indication that each of said sub-endpoints must be de-registered.

7. The H.323 system of claim 6, wherein said indication includes a single notation indicating that all of said sub-endpoints must be de-registered.

8. The H.323 system of claim 6, wherein said indication includes a range of port numbers associated with all of said sub-endpoints.

9. The H.323 system of claim 5, wherein said Call Signal Address parameter includes an Internet Protocol address associated with said sub-endpoints.

10. The H.323 system of claim 5, wherein said Call Signal Address parameter includes an Internet Protocol address for said main endpoint and a list of port numbers associated with select ones of said sub-endpoints.

11. The H.323 system of claim 5, wherein said at least two sub-endpoints are mobile stations, said main endpoint being a Mobile Switching Center that receives a RESET message from a Home Location Register.

12. The H.323 system of claim 11, wherein said Call Signal Address parameter includes an Internet Protocol address for said Mobile Switching Center that is associated with said Home Location Register and an indication that each of said mobile stations associated with said Internet Protocol address be de-registered.

13. The H.323 system of claim 11, wherein said Call Signal Address parameter includes an Internet Protocol address for said Mobile Switching Center and a list of port numbers associated with select ones of said mobile stations that are associated with said Home Location Register.

14. A method for substantially simultaneously de-registering multiple sub-endpoints within an H.323 system, comprising the steps of:
   determining, by a main endpoint within said H.323 system having at least two sub-endpoints associated therewith, that said sub-endpoints must be de-registered;
   sending a single de-registration message indicating that more than one of said at least two sub-endpoints must be de-registered to a Gatekeeper; and
   in response to said de-registration message, substantially simultaneously de-registering said more than one of said at least two sub-endpoints from said Gatekeeper.

15. The method of claim 14, wherein said step of sending said de-registration message further comprises the step of:
   sending an Unregistration Request message including a Call Signal Address parameter to said Gatekeeper.

16. The method of claim 15, wherein said step of sending further comprises the step of:
   including within said Call Signal Address parameter an Internet Protocol address of said main endpoint and an indication that all of said sub-endpoints must be de-registered.

17. The method of claim 15, wherein said step of sending further comprises the step of:
   including within said Call Signal Address parameter an Internet Protocol address associated with said sub-endpoints.

18. The method of claim 15, wherein said step of sending further comprises the step of:
   including within said Call Signal Address parameter an Internet Protocol address for said main endpoint and a list of port numbers associated with select ones of said sub-endpoints.

19. The method of claim 15, wherein said at least two sub-endpoints are mobile stations, said main endpoint being a Mobile Switching Center, and further comprising the step of:
   receiving, by said Mobile Switching Center, a RESET message from a Home Location Register.

20. The method of claim 19, wherein said step of sending further comprises the step of:
   including within said Call Signal Address parameter an Internet Protocol address for said Mobile Switching Center that is associated with said Home Location Register and an indication that each of said mobile stations associated with said Internet Protocol address be de-registered.

21. The method of claim 19, wherein said step of sending further comprises the step of:
   including within said Call Signal Address an Internet Protocol address for said Mobile Switching Center and a list of port numbers associated with select ones of said mobile stations that are associated with said Home Location Register.

22. A method for a mobile switching center within an H.323 system to substantially simultaneously de-register multiple mobile stations associated with said mobile switching center, comprising the steps of:
   receiving a RESET message at said mobile switching center;
   in response to said RESET message, determining that at least two of said mobile stations associated with said mobile switching center must be de-registered; and
   generating a single de-registration message indicating that more than one of said at least two mobile stations must be de-registered.

23. The method of claim 22, wherein said step of generating said de-registration message further comprises the step of:
   generating an Unregistration Request message including a Call Signal Address parameter.

24. The method of claim 23, wherein said step of generating further comprises the step of:
   including within said Call Signal Address parameter an Internet Protocol address of said mobile switching center and an indication that all of said mobile stations associated with said mobile switching center must be de-registered.

25. The method of claim 23, wherein said step of generating further comprises the step of:
   including within said Call Signal Address parameter an Internet Protocol address associated with said mobile stations.

26. The method of claim 23, wherein said step of generating further comprises the step of:
   including within said Call Signal Address parameter an Internet Protocol address for said mobile switching center and a list of port numbers associated with select ones of said mobile stations.

27. The method of claim 22, wherein said step of receiving further comprises the step of:
   receiving, by said mobile switching center, said RESET message from a Home Location Register.

28. The method of claim 27, wherein said step of generating further comprises the step of:
   including within said Call Signal Address parameter an Internet Protocol address for said mobile switching center that is associated with said Home Location Register and an indication that each of said mobile stations associated with said Internet Protocol address be de-registered.

29. The method of claim 27, wherein said step of generating further comprises the step of:
   including within said Call Signal Address an Internet Protocol address for said mobile switching center and a list of port numbers associated with select ones of said mobile stations that are associated with said Home Location Register.

30. The method of claim 22, further comprising the steps of:
   sending said de-registration message to a Gatekeeper within said H.323 system; and
   in response to said de-registration message, substantially simultaneously de-registering said more than one of said at least two mobile stations from said Gatekeeper.

* * * * *